United States Patent [19]
Nakai et al.

[11] Patent Number: 6,003,939
[45] Date of Patent: Dec. 21, 1999

[54] SIDE AIR BAG-CARRYING SEAT STRUCTURE

[75] Inventors: Shigeharu Nakai; Masanori Oyabu; Hisaaki Kato; Makoto Asano, all of Toyota; Hideyuki Yamanaka, Hikinan; Yasuji Onuki, Yokohama, all of Japan

[73] Assignees: Toyota Jidosha Kabushiki Kaisha; Araco Kabushiki Kaisha, both of Toyota; Bridgestone Corporation, Tokyo, all of Japan

[21] Appl. No.: 09/068,218
[22] PCT Filed: Sep. 2, 1997
[86] PCT No.: PCT/JP97/03070
§ 371 Date: Jun. 24, 1998
§ 102(e) Date: Jun. 24, 1998
[87] PCT Pub. No.: WO98/09849
PCT Pub. Date: Mar. 12, 1998

[30] Foreign Application Priority Data

Sep. 3, 1996 [JP] Japan .................................. 8-233294

[51] Int. Cl.⁶ ...................................................... B60N 2/42
[52] U.S. Cl. .................................. 297/216.13; 297/452.6; 286/730.2
[58] Field of Search ............................. 280/728.2, 728.3, 280/730.1, 730.2; 297/452.59, 452.6, 216.13

[56] References Cited

U.S. PATENT DOCUMENTS

| | | | |
|---|---|---|---|
| 3,727,980 | 4/1973 | Tischler | 297/452.6 |
| 4,317,591 | 3/1982 | Ramsey | 297/452.6 |
| 4,558,905 | 12/1985 | Natori | 297/452.6 |
| 5,112,079 | 5/1992 | Haland et al. . | |
| 5,222,761 | 6/1993 | Kaji et al. . | |
| 5,251,931 | 10/1993 | Semchena et al. . | |
| 5,338,098 | 8/1994 | Ohnishi | 297/452.6 |
| 5,348,342 | 9/1994 | Haland et al. . | |
| 5,498,030 | 3/1996 | Hill et al. . | |
| 5,533,750 | 7/1996 | Karlow et al. . | |
| 5,547,214 | 8/1996 | Zimmerman, II et al. . | |
| 5,553,887 | 9/1996 | Karlow et al. . | |
| 5,564,739 | 10/1996 | Davidson . | |
| 5,588,671 | 12/1996 | Boumarafi et al. . | |
| 5,601,332 | 2/1997 | Schultz et al. | 280/730.2 |
| 5,630,615 | 5/1997 | Miesik . | |

FOREIGN PATENT DOCUMENTS

| | | |
|---|---|---|
| 61-144900 | 9/1986 | Japan . |
| 7-315156 | 12/1995 | Japan . |
| 8-216820 | 8/1996 | Japan . |
| 9-076868 | 3/1997 | Japan . |
| 9-295547 | 11/1997 | Japan . |

Primary Examiner—Anthony D. Barfield
Attorney, Agent, or Firm—Pillsbury Madison & Sutro LLP

[57] ABSTRACT

In a seat structure having a side air bag device, a longitudinal groove (36) is formed in a seat back pad (14) along the longitudinal direction of the seat back pad, and an insert wire (40) which holds a seat outer cover, is embedded in the longitudinal groove (36). Bent portions (44) are formed in portions of the insert wire (40), which portions oppose the air bag device. Each of the bent portions (44) is bent in a substantially U-shaped configuration, and a slab pad (46) is wound around an outer peripheral portion of a base portion (44A) of each bent portion. Further, the bent portions (44) of the insert wire (40) are each provided to extend rearwardly and diagonally toward the inner side of a seat back (10) so that the embedded length of the insert wire (40) embedded in the seat back pad (14) is made longer, and adverse influences on riding comfort are thereby suppressed.

9 Claims, 9 Drawing Sheets

F I G. 4
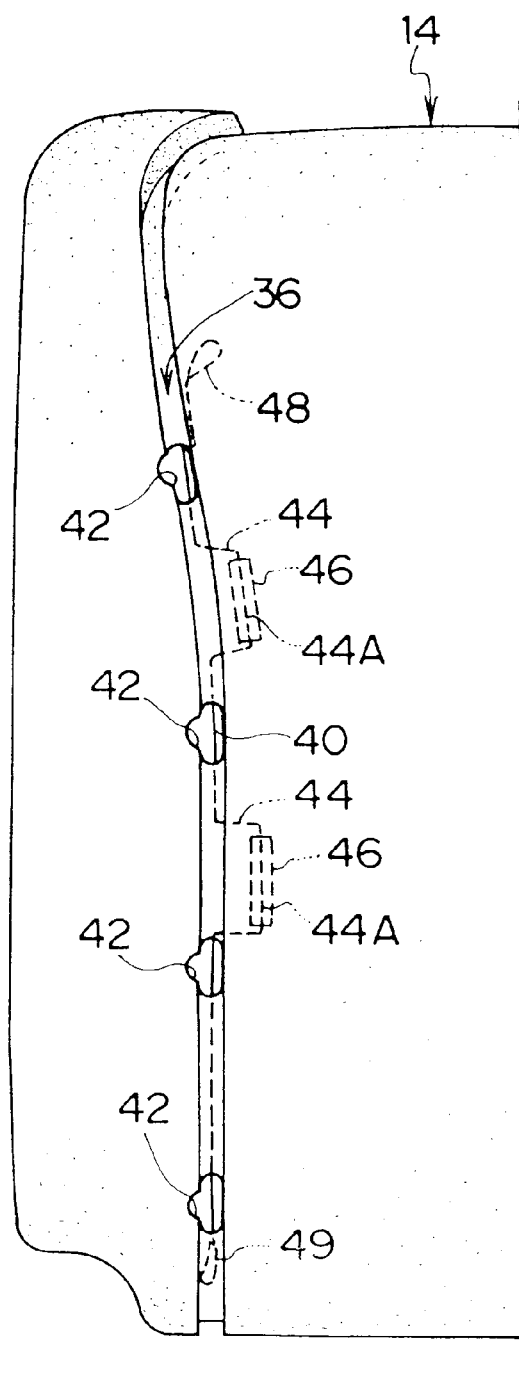

SIDE AIR BAG-CARRYING SEAT STRUCTURE

This application is the national phase of international application PCT/JP97/03070 filed Sep. 2, 1997 which designated the U.S.

BACKGROUND ART

There have conventionally been considered counterplans for improvement of an occupant protecting ability at the time of a side surface impact (hereinafter, "side impact") of a vehicle. In recent years, the building-in of a side-impact air bag device at a side portion of a front seat of a vehicle has been promoted. A structure of this type of front seat having a side-impact air bag device built-in is disclosed in Japanese Patent Application Laid-Open (JP-A) No. 6-64491. The structure disclosed therein will be described hereinafter, focusing on the relation between the seat outer cover and the air bag device.

FIG. 8 shows a side view of a front seat 150 having an air bag device built-in and disclosed in the above prior art. As shown in this figure, a side-impact air bag device 154 is built-in in a side portion, toward a door, of a seat back 152 of the front seat 150. The side-impact air bag device 154 is structured to basically include a sensor 157 disposed below a seat cushion 156 and detecting a state of a large load being applied to a side door (not shown), a substantially cylindrical inflator 158 connected to the sensor 157 and ejecting gas by the sensor 157 detecting a state in which a large load is applied, and a bag 160 which inflates due to gas ejected from the inflator 158. Further, as shown in FIG. 9, the inflator 158 and the bag 160 are accommodated in an internal space formed by an air bag case 164 and a lid 166 which are fixed to a side portion, toward the door, of a seat back frame 162.

Further, in the structure disclosed in the above prior art, an outer cover 168 of the seat back 152 is formed by stitching a plurality of divided portions so as to allow an opening movement of the lid 166 at the time the bag inflates. Namely, the outer cover 168 of the seat back 152 is divided into a front main outer cover 170 which covers a front surface of a central portion of the seat back 152, two front side outer covers 172, 174 which cover respective front sides of side portions of the seat back 152, a seat back side portion outer cover 176 which covers the lid 166 of the air bag device 154, and a rear outer cover 178 which covers a back side of the seat back 152.

In order to allow opening of the seat back side portion outer cover 176 located at the side of the lid 166, a front end portion 176A of the seat back side portion outer cover 176 and a rear end portion 174A of the front side outer cover 174 are sewn together by a sewing thread 180. The sewing strength at the above sewn-together portion is set to be low by sewing by single stitching as shown in FIG. 9. Accordingly, this sewn-together portion is used as a rupture portion. In contrast, a rear end portion 176B of the seat back side portion outer cover 176 and a front end portion 178A of the rear outer cover 178 are each formed into a loop and are stitched by using sewing threads 182, 184, and further, the loop-shaped rear end portion 176B and front end portion 178A are sewn together by a sewing thread 186. The sewing strength at this sewn-together portion is set to be high by sewing by double stitching as shown in FIG. 9. Accordingly, this sewn-together portion does not rupture, and serves as a hinge used for the opening movement of the seat back side portion outer cover 176.

Accordingly, when the bag 160 unfolds due to gas ejected from the inflator 158, the lid 166 opens toward an outer side of the seat (i.e., in the direction indicated by arrow W in FIG. 9) around a hinge portion 166A formed at the rear end of the lid 166. Due to the opening force of the lid 166, the portion where the front end portion 176A of the seat back side portion outer cover 176 and the rear end portion 174A of the front side outer cover 174 are sewn together is broken.

However, in this seat structure having a side air bag device, an insert wire 192 is embedded in a seat back pad 190 in the vicinity of an occupant supporting surface (top plate portion) 190A. A sewn-together portion of the front main outer cover 170 and the front side outer cover 172 is engaged with the insert wire 192 via a hanging member 188 for bringing forth the designed seat configuration. Accordingly, at an initial stage of unfolding of the bag 160, a pull-out load acts on the insert wire 192 due to reactive force of the seat outer cover 168 caused by the unfolding force of the bag 160. When the pull-out load increases and the insert wire 192 is thereby pulled out from the seat back pad 190, the outer cover 168 extends greatly outward in the transverse direction of the seat and toward the front of the vehicle as indicated by the two-dot chain line in FIG. 9. For this reason, the sewn-together portion formed by the sewing thread 180, which was originally intended to be broken, is difficult to break. Accordingly, the unfolding speed of the bag 160 may decrease or the unfolded form of the bag 160 may be unstable.

As art related to the present invention, Japanese Patent Application Laid-Open (JP-A) No. 9-76868 (laid-open on Mar. 25, 1997) discloses an end of a front-side seat outer cover of a sewn-together portion to be broken and a seat-side fixing member being connected together by a strong cloth.

DISCLOSURE OF THE INVENTION

In view of the above-described facts, it is an object of the present invention to provide a seat structure having a side air bag device which prevents pull-out of an insert wire and allows rapid and stable unfolding of a side-impact air bag body.

In accordance with the present invention, there is provided a seat structure having a side air bag device, in which a seat having a side air bag device built-in is covered with a seat outer cover, wherein an insert wire, which holds a hanging member for bringing forth the designed seat configuration, is embedded in a vehicle occupant supporting surface of a seat back pad, and means for preventing pull-out of the insert wire is provided at a portion of an embedded portion of the insert wire embedded in the seat back pad. As a result, at the time of a side impact of a vehicle, an air bag body accommodated in the air bag device expands to push the seat outer cover from the inner side of the seat. The insert wire is thereby about to be pulled out from the seat back pad via the hanging member for bringing forth the designed seat configuration. Due to the pull-out preventing means which is provided at a portion of an embedded portion of the insert wire embedded in the seat back pad, load which causes the insert wire to be pulled out from the seat back pad increases to prevent pull-out of the insert wire. And, rising up of a top plate portion of the seat outer cover is prevented. As a result, the seat outer cover is broken rapidly from a predetermined sewn-together portion, and rapid and stable unfolding of the air bag body can be achieved.

BRIEF DESCRIPTION OF THE DRAWINGS

FIG. 4 is a front view which shows a half, at the side of a side door of a vehicle, of a seat back pad of a seat structure having a side air bag device according to a modified example of the first embodiment of the present invention.

BEST MODE FOR IMPLEMENTING THE INVENTION

A description will be hereinafter given of a seat structure having a side air bag device according to a first embodiment of the present invention with reference to FIGS. 1 to 3.

Figure 2:
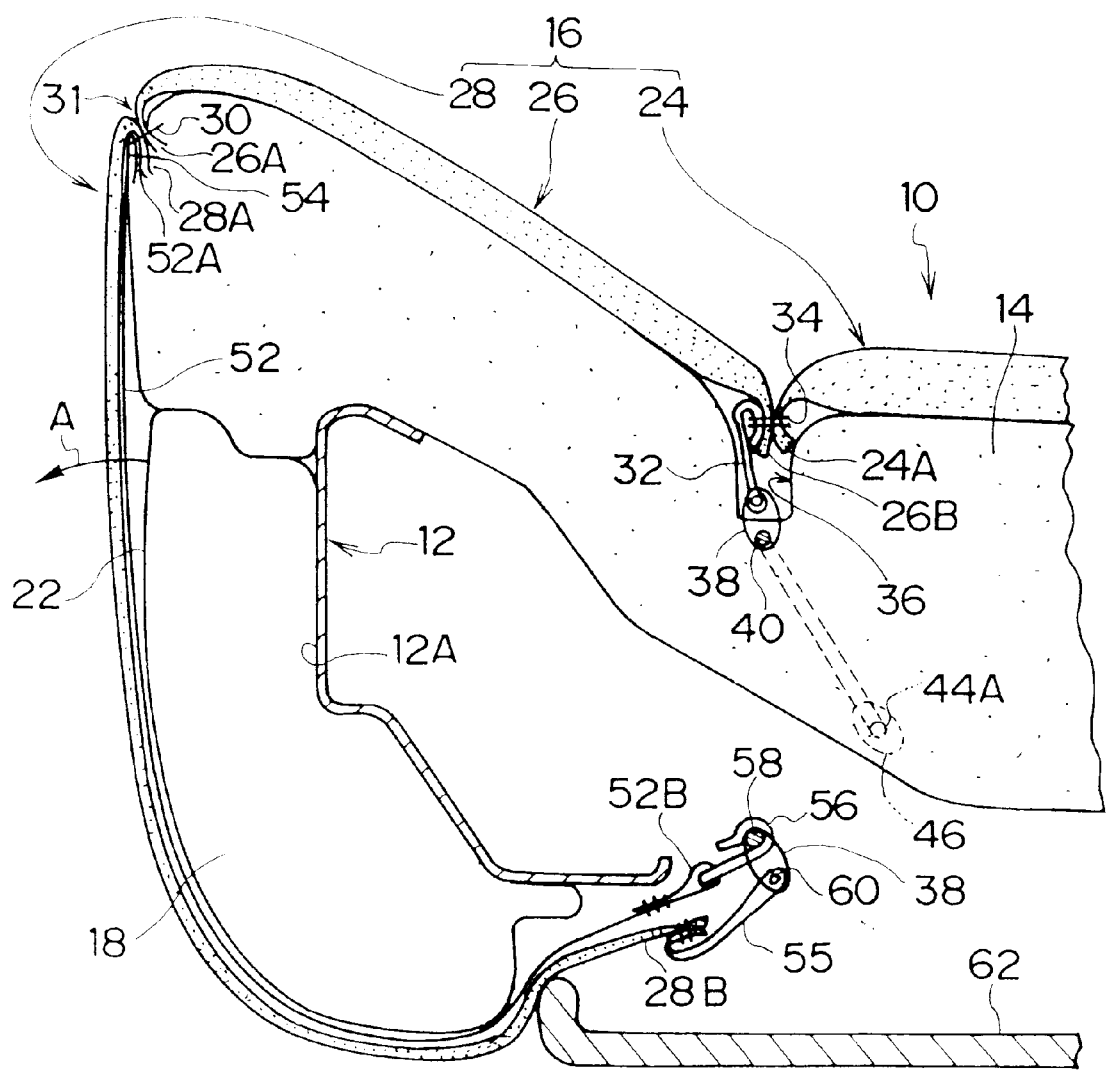
FIG. 2 is an enlarged cross-sectional view taken along line 2—2 in FIG. 3.

As shown in FIG. 2, a seat back 10 of the seat according to the first embodiment of the present invention includes a seat back frame 12 which forms a frame member of the seat back and has a substantially rectangular frame shape, a seat back pad 14 mounted at the front side of the seat back frame 12 and set to a predetermined hardness by using urethane resin or the like, and a seat back outer cover 16 which covers the surface of the seat back pad 14.

Figure 3:
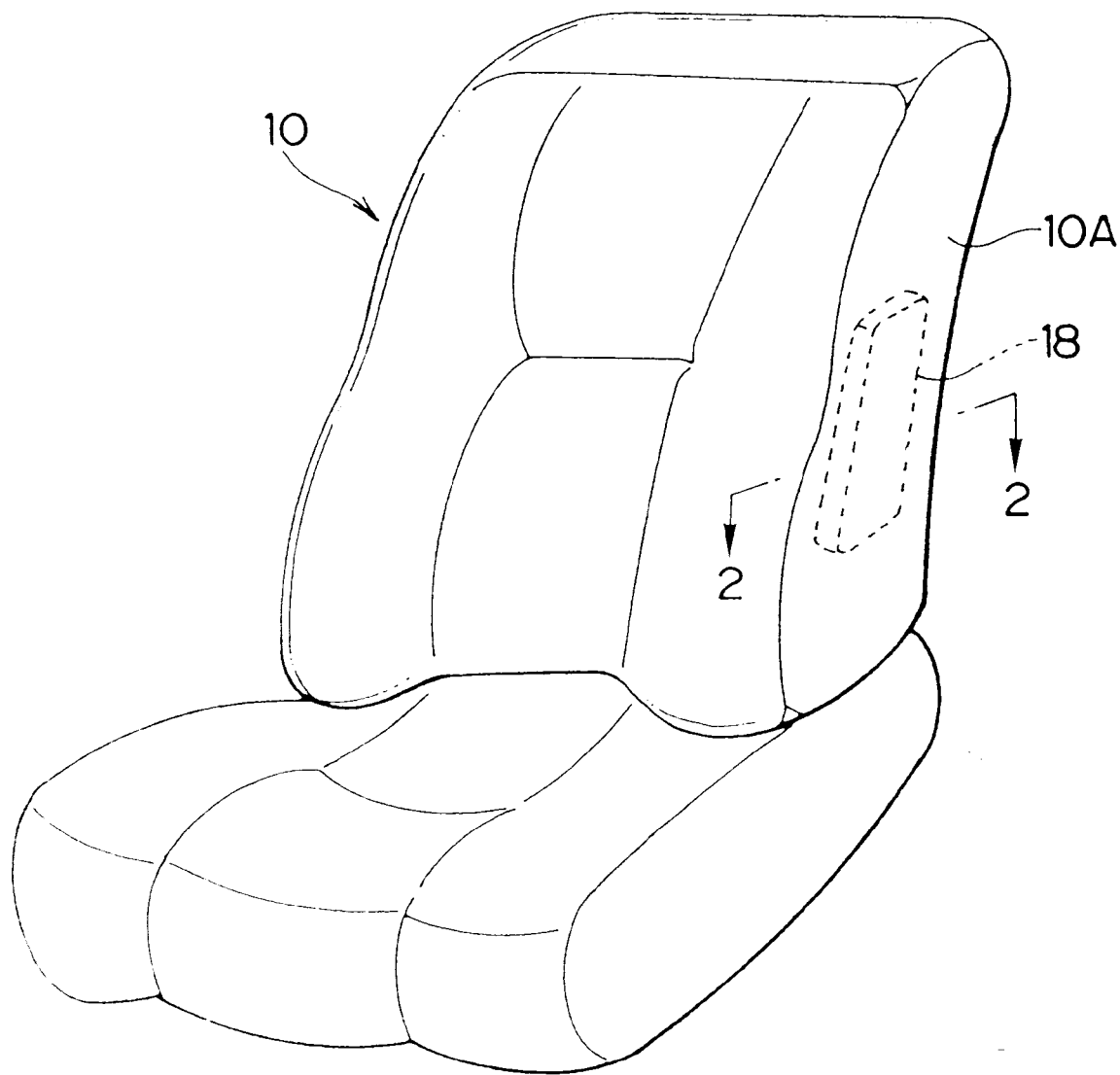
FIG. 3 is a perspective view which shows a seat to which the seat structure having a side air bag device according to the first embodiment of the present invention is applied.

As shown in FIG. 3, a side-impact air bag device 18 is built-in in a side portion 10A, toward a side door of a vehicle, of the seat back 10.

As shown in FIG. 2, the air bag device 18 is fixed to a side portion 12A of the seat back frame 12 and is a commonly known device provided to inflate and unfold an air bag body by an inflator. Therefore, description and illustration of the component parts of the air bag device 18 will be omitted.

A lid 22 is disposed at the side-impact air bag device 18 at a position facing the side door of the vehicle. When the air bag body unfolds, the lid 22 opens toward an outer side of the seat (i.e., in the direction indicated by arrow A in FIG. 2).

A seat back outer cover 16 is divided into a plurality of portions. Specifically, the seat back outer cover 16 is divided into a front main outer cover 24, a front side outer cover 26, and a seat back side portion outer cover 28. The front main outer cover 24 forms a portion of a front surface seat outer cover and covers a front surface of the central portion of the seat back pad 14, the front side outer cover 26 forms a portion of the front surface seat outer cover and covers a front surface of the side portion of the seat back 10, and the seat back side portion outer cover 28 forms a side surface seat outer cover and covers a side surface of the side portion of the seat back 10.

The seat outer cover 16 has a three-layer or five-layer structure in which a cushioning material is held between two sheets of cloth materials.

A front end 28A of the seat back side portion outer cover 28 and an outer end 26A of the front side outer cover 26 are sewn together by a sewing thread 30. A sewn-together portion 31 of the front end 28A of the seat back side portion outer cover 28 and the outer end 26A of the front side outer cover 26 is positioned at the front side of and in the vicinities of front edge portions of the lid 22 and the air bag body. The sewn-together portion 31 is formed as a sewn-together portion to be broken by the lid 22 when the air bag body inflates.

An inner end 26B of the front side outer cover 26 and a hanging cotton cloth member 32, which has a loop-shaped cross-sectional configuration and is formed as a hanging member for bringing forth the designed seat configuration, are sewn to an outer end 24A of the front main outer cover 24 by a sewing thread 34. Further, the sewn-together portion formed by the sewing thread 34 and the hanging cotton cloth member 32 are inserted into a vertical groove 36 formed in the seat back pad 14 along the vertical direction (up and down directions). The front side outer cover 26 and the front main outer cover 24 are caught by an insert wire 40 embedded in a bottom portion of the longitudinal groove 36 via the cotton cloth member 32 and a C-shaped ring 38 attached to the hanging cotton cloth member 32.

Figure 1:
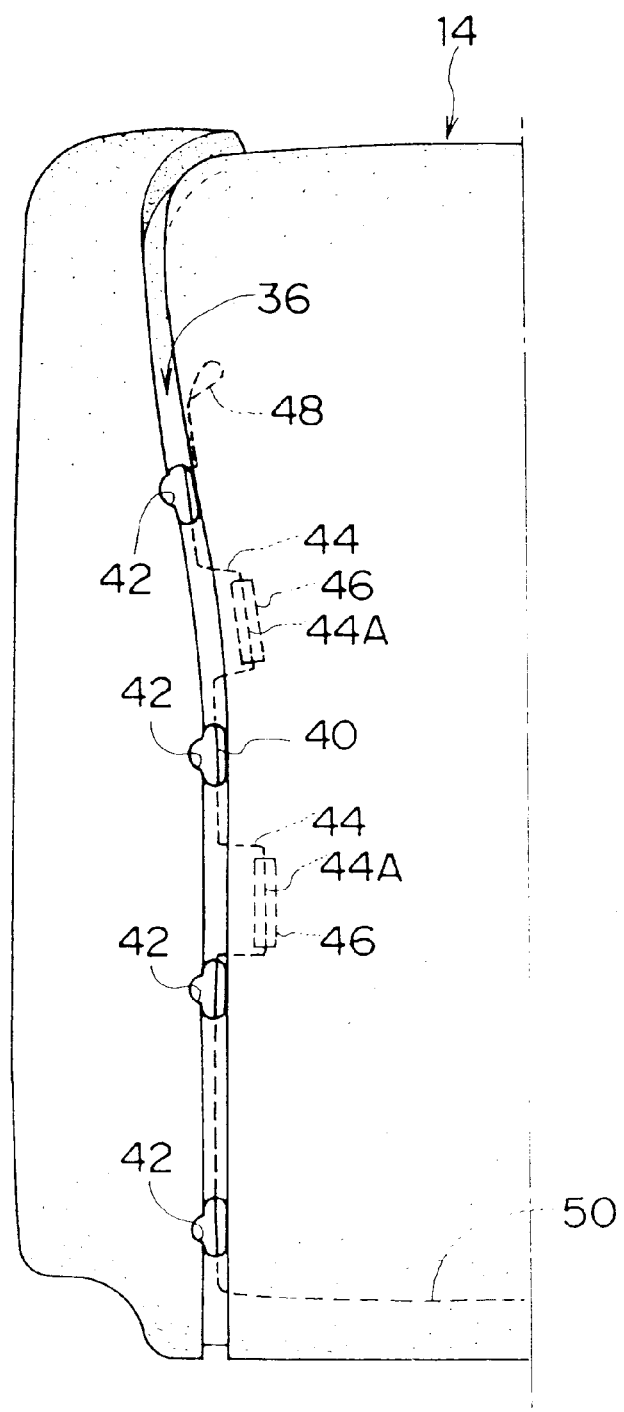
FIG. 1 is a front view which shows a half, at the side of a side door of a vehicle, of a seat back pad of a seat structure having a side air bag device according to a first embodiment of the present invention.

As shown in FIG. 1, concave portions 42 are formed in the bottom portion of the vertical groove 36 along the vertical direction at predetermined intervals, and the insert wire 40 is exposed in the concave portions 42. For this reason, in the concave portions 42, the C-shaped ring 38 is hooked on the insert wire 40.

Bent portions 44 formed by the insert wire 40 being bent convexly are provided as a pull-out preventing means at respective positions, facing the air bag device 18 (see FIG. 3), between top and second concave portions 42 from the top and between the second and third concave portions 42. Each of the bent portions 44 is formed to have a substantially U-shaped configuration, and a slab pad 46 serving as winding means (pull-out preventing means) is wound around an outer peripheral portion of a base portion 44A of each bent portion 44. The material for the seat back pad 14 is impregnated into the slab pad 46 and foams.

As shown in FIG. 2, the bent portions 44 of the insert wire 40 are provided to extend rearwardly and diagonally toward the inner side of the seat back 10. As a result, the embedded length of the insert wire 40 embedded in the seat back pad 14 is made longer, and adverse influences exerted on riding comfort are suppressed.

As shown in FIG. 1, a bent portion 48 is formed at an upper end portion of the insert wire 40. The bent portion 48 is formed in the shape of a loop and extends in the same direction as the direction in which the bent portions 44 extend. Further, respective lower end portions of the insert wires 40 provided at the left and right sides of the seat back 10 are connected to each other by a connecting portion 50 extending along the transverse direction of the seat back 10.

As shown in FIG. 2, a cotton cloth member 52 which is more difficult to extend than the seat outer cover is disposed at an inner side of the seat back side portion outer cover 28. A front end 52A of the cotton cloth member 52 is sewn provisionally to a front end 28A of the seat back side portion outer cover 28 by a provisionally sewing thread 54, and is also sewn by the sewing thread 30 to the front side outer cover 26 together with the seat back side portion outer cover 28 at a position at an outer side of the provisionally sewing thread 54.

A rear end 52B of the cotton cloth member 52 is engaged via a hook 58 with a wire 58 serving as a seat-side fixing member and provided in the seat back frame 12. Further, a rear end 28B of the seat back side portion outer cover 28 is hooked by the C-shaped ring 38 on a wire 58 provided in the seat back frame 12 in such a manner that a hanging wire 60 passes through a loop-shaped cotton cloth member 55. In FIG. 2, reference numeral 62 designates a portion of a backboard mounted on the rear surface of the seat back.

Next, operation of the first embodiment of the present invention will be described.

In the seat structure having a side air bag device according to the first embodiment of the present invention, when an inflator of the air bag device 18 is actuated at the time of a side collision of a vehicle, the air bag body inflates due to gas ejected from the inflator to push the lid 22 of an air bag case open in the direction indicated by arrow A in FIG. 2.

In this case, the cotton cloth member 52 is provided at the inner side of the seat back side portion outer cover 28, and the rear end 28B of the seat back side portion outer cover 28 and the rear end 52B of the cotton cloth member 52 are respectively connected to the wires 60, 58 via the cotton cloth member 55 and the hook 56. For this reason, stress caused by expansion of the air bag body concentrates at the sewn-together portion 31 via the cotton cloth member 52.

Further, in the seat structure having a side air bag device according to the first embodiment of the present invention, the substantially U-shaped bent portions 44, the bent portion 48, and the connecting portion 50 are formed at the insert wire 40 and the embedded length of the insert wire 40 embedded in the seat back pad 14 thereby increases. For this reason, the insert wire 40 is not pulled out from the seat back pad 14 due to reactive force of the front side outer cover 26.

Accordingly, the seat structure having a side air bag device according to the first embodiment of the present invention can suppress pulling-out of the insert wire 40 and cause the sewn-together portion 31 to be instantaneously broken so as to allow rapid and stable unfolding of the side-impact air bag body.

Further, in the seat structure having a side air bag device according to the first embodiment of the present invention, the slab pad 46 is wound around the outer periphery of the base portion 44A of each bent portion 44 of the insert wire 40, and therefore, it is even more difficult pull out the insert wire 40 from the seat back pad 14.

Moreover, the seat structure having a side air bag device according to the first embodiment of the present invention is provided such that the bent portions 44 of the insert wire 40 extend rearwardly and diagonally toward the inner side of the seat back 10. For this reason, adverse influences of the insert wire 40 on riding comfort can be suppressed.

In addition, in the seat structure having a side air bag device according to the first embodiment of the present invention, respective lower ends of the insert wires 40 disposed at the left and right sides of the seat back are connected to each other by the connecting portion 50 extending along the transverse direction of the seat back. However, alternatively, as shown in FIG. 4, the insert wires 40 disposed at the left and right sides of the seat back may be separated from each other, and respective lower end portions 49 of the insert wires 40 may each be formed in the shape of a loop.

Figure 5:
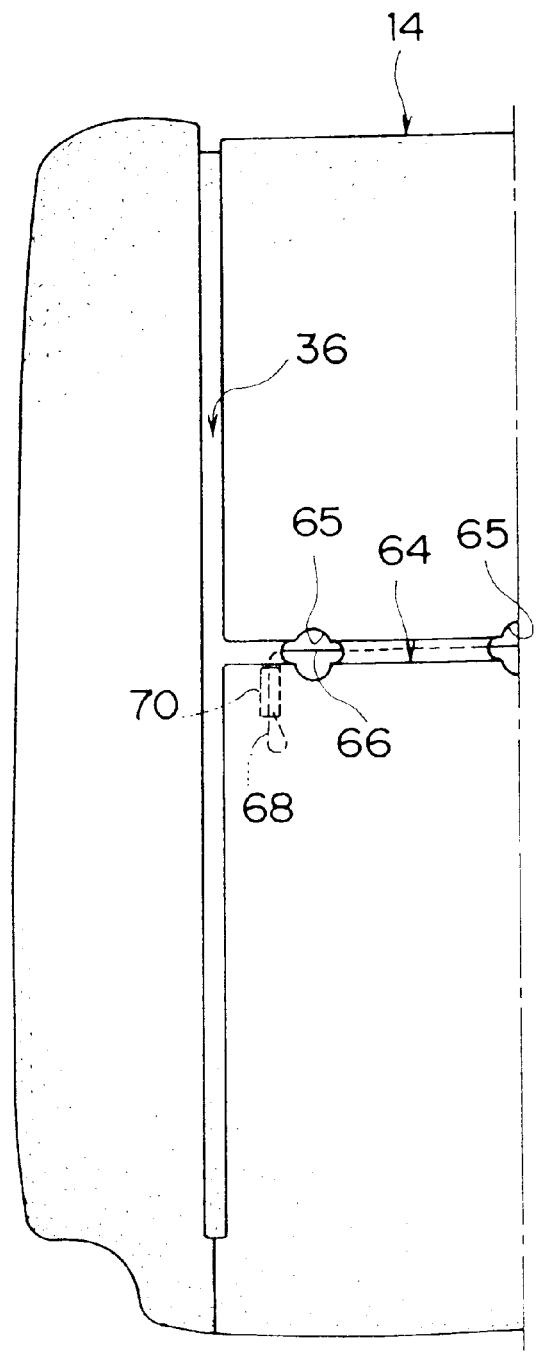
FIG. 5 is a front view which shows a half, at the side of a side door of a vehicle, of a seat back pad of a seat structure having a side air bag device according to another modified example of the first embodiment of the present invention.

Further, in the first embodiment of the present invention, there was described a so-called longitudinal hanging type seat structure in which the seat back outer cover 16 is hung up and supported by the insert wires 40 embedded along the vertical direction of the seat back pad 14. However, the seat structure having a side air bag device according to the present invention can be, as shown in FIG. 5, also applied to a so-called transverse hanging type seat structure in which the seat back outer cover is hung up and supported by an insert wire 66 embedded in a bottom portion of a transverse groove 64 formed along the transverse direction of the seat back pad 14. In FIG. 5, a concave portion 65 is formed in the transverse groove 64, a bent portion 68 is formed at an end portion of an insert wire 66, and a slab pad 70 serving as a winding member (i.e., pull-out preventing means) is wound around an outer peripheral portion of the bent portion 68.

Next, a seat structure having a side air bag device according to a second embodiment of the present invention will be described with reference to FIGS. 6 and 7.

It should be noted that the same members as those of the first embodiment will be denoted by the same reference numerals, and a description thereof will be omitted.

Figure 6:
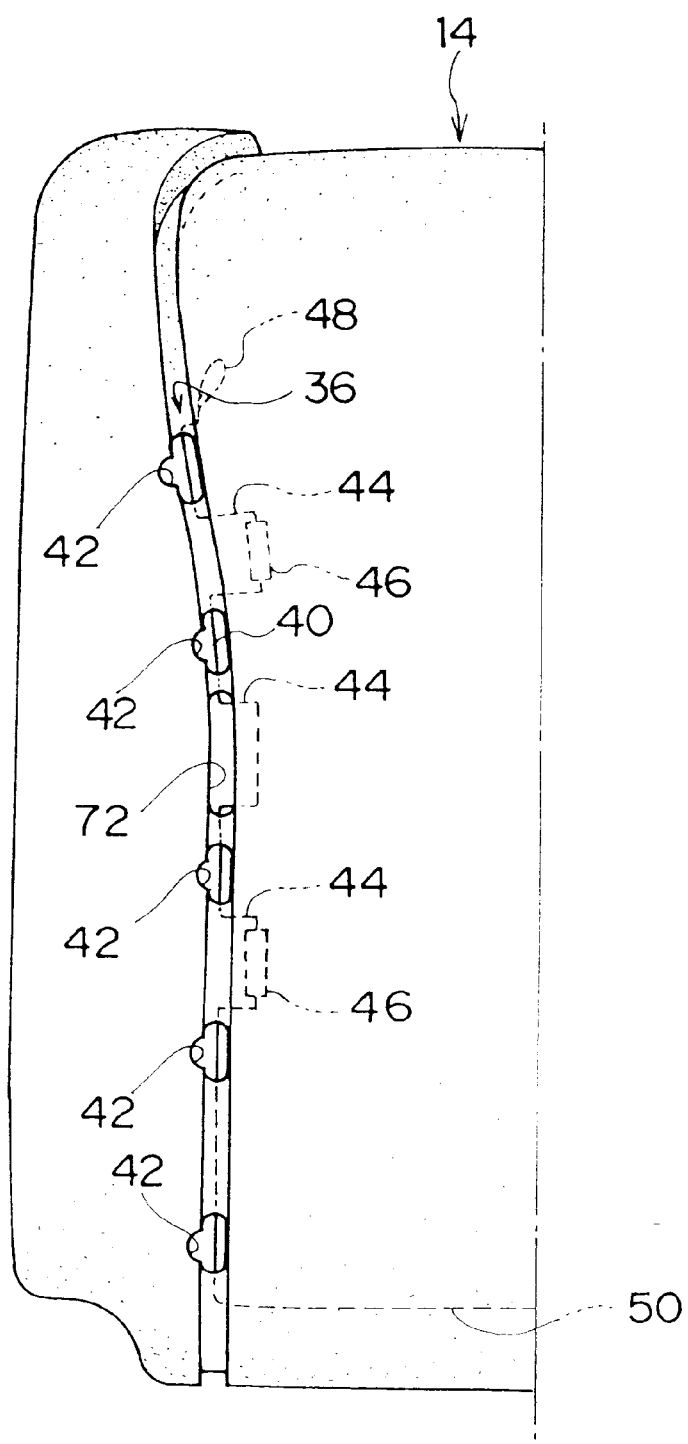
FIG. 6 is a front view which shows a half, at the side of a side door of a vehicle, of a seat back pad of a seat structure having a side air bag device according to a second embodiment of the present invention.

As shown in FIG. 6, in the seat structure having a side air bag device according to the second embodiment of the present invention, a through hole 72 is formed at a position in a vicinity of the vertical direction central portion of the air bag device in a bottom portion of a vertical groove 36 of the seat back pad 14, such that the longitudinal direction of the through hole 72 coincides with the vertical direction of the air bag device.

Figure 7:
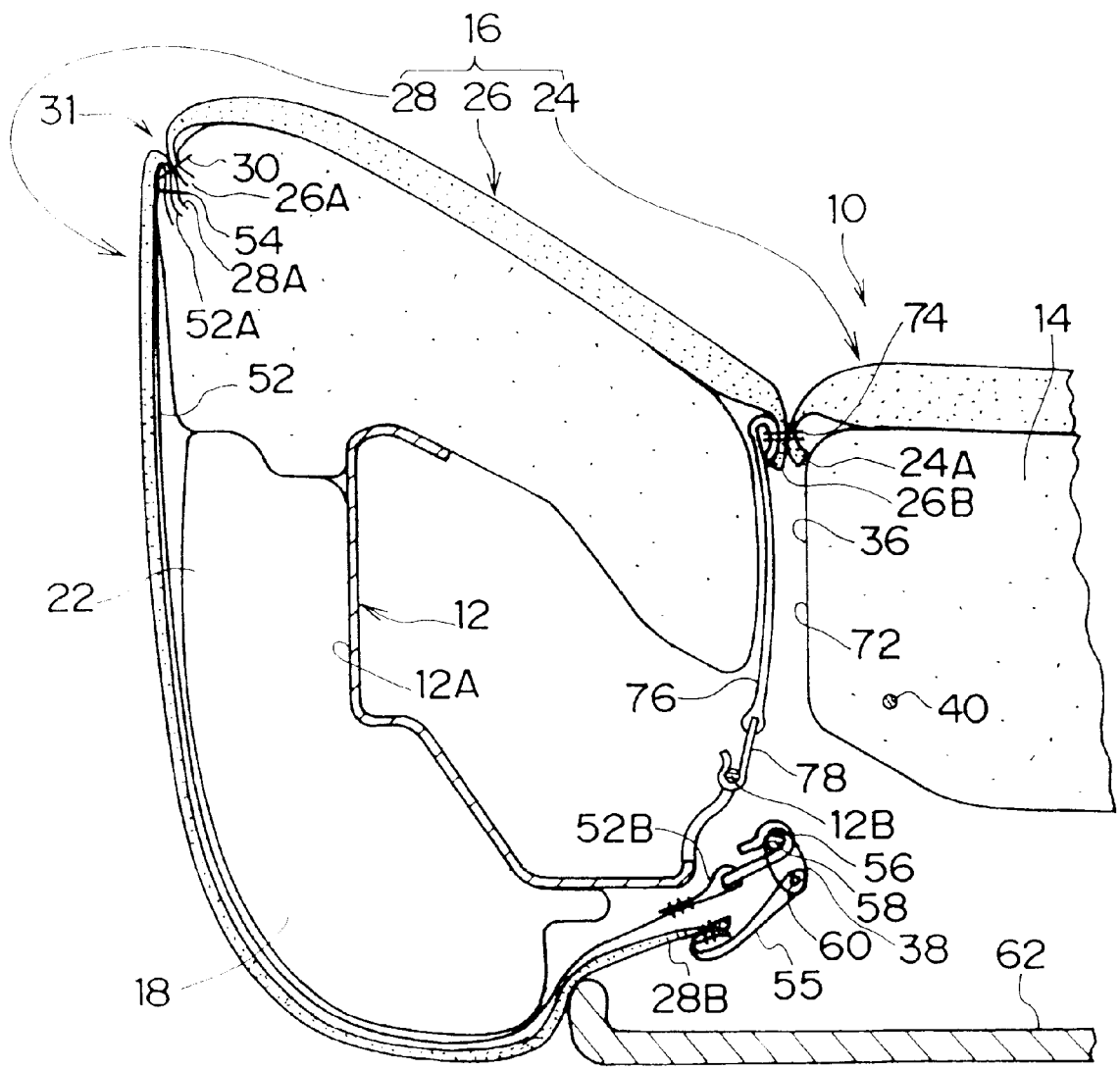
FIG. 7 is a cross-sectional view, corresponding to FIG. 2, of the seat structure having a side air bag device according to the second embodiment of the present invention.
Figure 8:
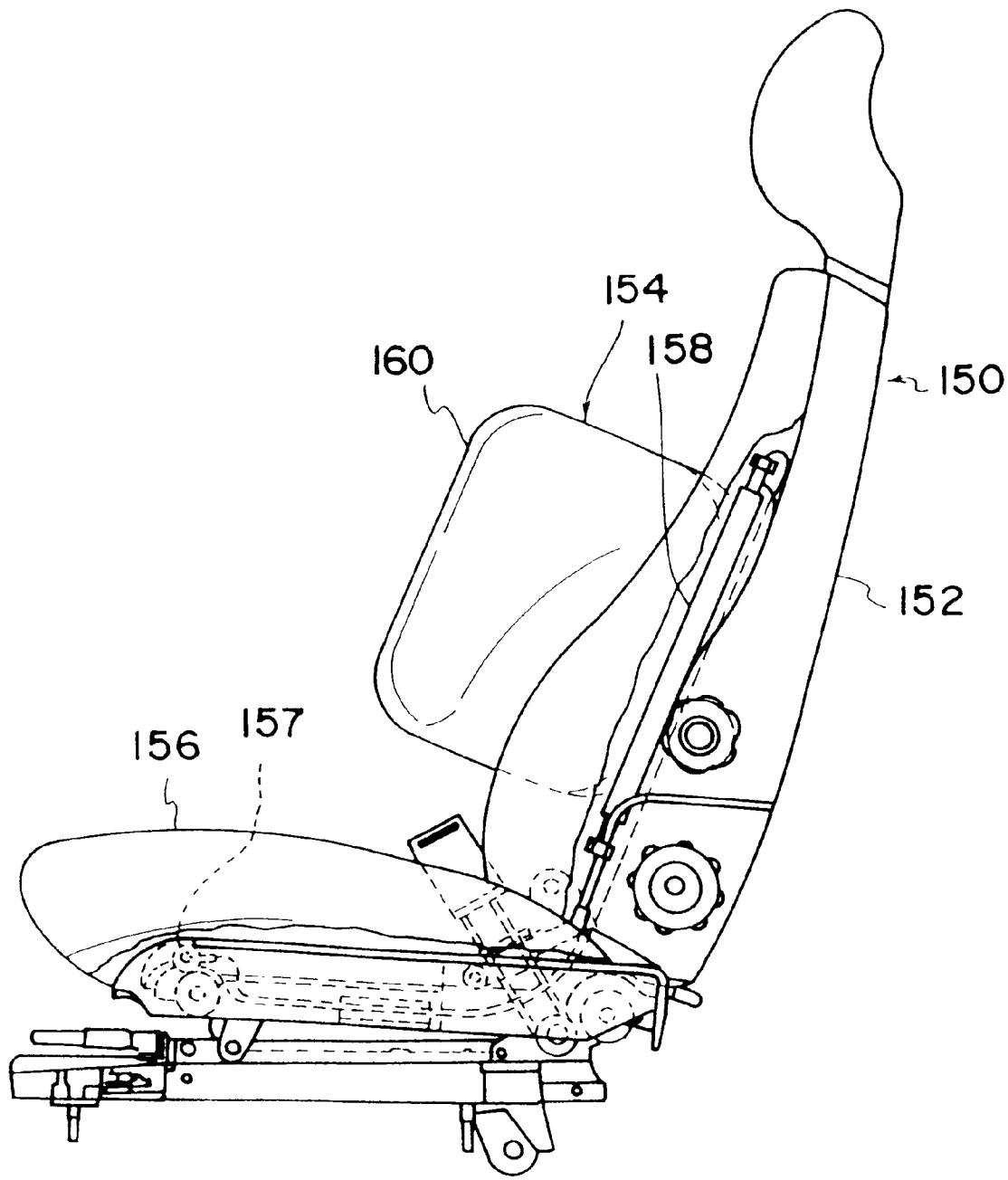
FIG. 8 is a schematic side view which shows a seat structure having a side air bag device according to a conventional example.
Figure 9:
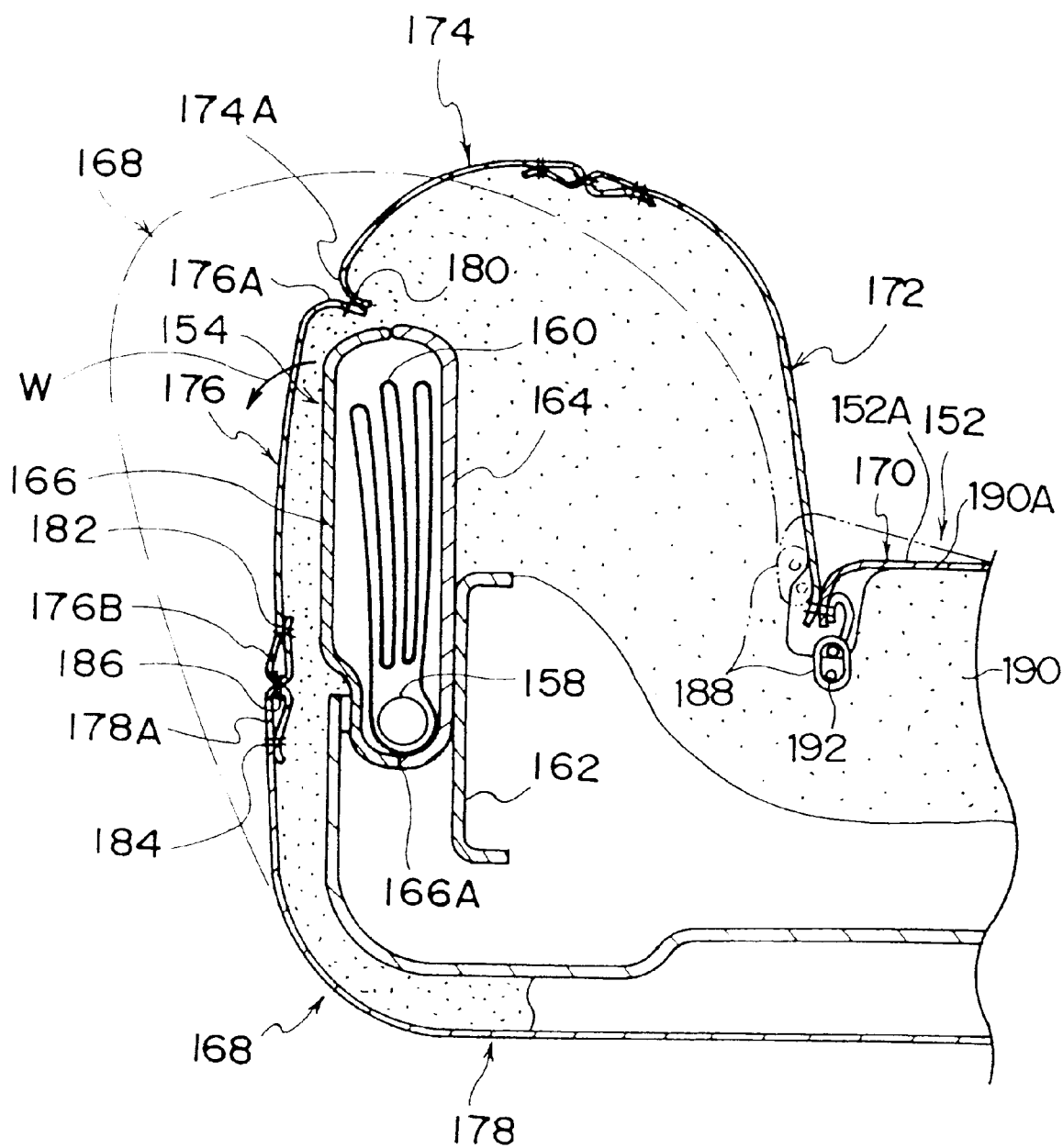
FIG. 9 is a horizontal cross-sectional view which shows a side portion of the seat structure having a side air bag device according to the conventional example.

As shown in FIG. 7, a strong cloth 76 having a loop-shaped cross-sectional configuration and serving as connecting means (i.e., pull-out preventing means) passes through the through hole 72 in such a manner as to be sewn to the inner end 26B of the front side outer cover 26 and the outer end 24A of the front main outer cover 24 by a sewing thread 74. The strong cloth 76 is engaged via a hook 78 with an engaging portion 12B, which serves as a seat-side fixing member, of the seat back frame 12.

Accordingly, in the seat structure having a side air bag device according to the second embodiment of the present invention, due to the reactive force of the front side outer cover 26 being supported by the webbing cloth 76 during inflation of the air bag body, the insert wire 40 can be prevented from being pulled out from the seat back pad 14. For this reason, as compared with the first embodiment, the sewn-together portion 31 can be instantaneously broken more effectively, and rapid and stable unfolding of the side-impact air bag body can be achieved.

In the foregoing description, the present invention was described with respect to specified embodiments. However, the present invention is not limited to these embodiments, and it will be clear to those skilled in the art that other variations may be made within the scope of the present invention. For example, in the present embodiments, the slab pad 46 is used as the winding member, but in place of the slab pad 46, another winding member formed by a felt material or the like may be used.

INDUSTRIAL APPLICABILITY

As described above, the seat structure having a side air bag device according to the present invention is useful for rapid and stable unfolding of a side-impact air bag body. Specifically, in a seat structure having a side air bag device built-in at a side portion of a seat back toward a door of a vehicle, the present invention is suitable for suppressing pulling-out of an insert wire and for rapidly and stably unfolding the side-impact air bag body.

We claim:

1. A seat structure having a side air bag device comprising:
   a seat back pad disposed adjacent to the side air bag device;
   a seat outer cover covering the seat back pad and the side air bag device; and
   an insert wire embedded in the seat back pad,
   wherein portions of the seat outer cover covering the side air bag device are attached at a plurality of points to the insert wire, and wherein the insert wire between adjacent connection points includes a convex bent portion which projects rearwardly.

2. A seat structure having a side air bag device according to claim 1, wherein the bent portion of the insert wire is provided to extend rearwardly and diagonally toward an inner side of the seat back pad.

3. A seat structure having a side air bag device according to claim 1, further comprising a second insert wire, wherein left and right longitudinal grooves are provided in the seat back pad along the vertical direction of the seat back pad, and wherein the first insert wire is embedded in a bottom portion of the left groove and the second insert wire is embedded in a bottom portion of the right groove, and respective lower ends of the insert wires are connected together in the transverse direction of the seat structure.

4. A seat structure having a side air bag device according to claim 1, further comprising a second insert wire, wherein left and right longitudinal grooves are provided in the seat back pad along the vertical direction of the seat back pad, and wherein the insert wires are embedded independently in bottom portions of the left and right grooves and both end portions of each of the insert wires are each bent in a loop shape.

5. A seat structure having a side air bag device according to claim 1, wherein the insert wire is embedded in a bottom portion of a transverse groove provided in the transverse direction of the seat back pad, and an end portion of the insert wire is bent in a loop shape.

6. A seat structure having a side air bag device in which the seat structure having the side air bag device is covered with a seat outer cover,
   wherein an insert wire is embedded in a vehicle occupant supporting surface of a seat back pad of the seat structure, and a winding member is provided at a portion of an embedded portion of the insert wire embedded in the seat back pad, so as to allow a material for the seat back pad to be impregnated into the seat back pad and to foam.

7. A seat structure having a side air bag device according to claim 6, wherein at least a section of the insert wire which section opposes the air bag device is bent convexly toward a rear side of a vehicle, and the winding member is provided at the bent section.

8. A seat structure having a side air bag device, in which the seat structure having the side air bag device is covered with a seat outer cover,
   wherein an insert wire is embedded in a vehicle occupant supporting surface of a seat back pad of the seat structure, a through hole is formed in the seat back pad at a position opposing the air bag device, and connecting means connected to the seat outer cover is engaged with a seat-side fixing member via the through hole.

9. A seat structure having a side air bag device according to any one of claims 1, 4, 6, 7, or 8, wherein a cloth which is more difficult to extend than the seat outer cover is provided at a rear surface of a side surface seat outer cover, a front end of the cloth is sewn to a sewn-together portion to be broken, and a rear end of the cloth is engaged with a seat-side fixing member.

* * * * *